US006930790B1

(12) United States Patent
Forthoffer

(10) Patent No.: US 6,930,790 B1
(45) Date of Patent: Aug. 16, 2005

(54) COLOR RENDERING DICTIONARY FOR TESTING COLOR CONVERSION

(75) Inventor: David J. Forthoffer, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/563,121

(22) Filed: May 1, 2000

(51) Int. Cl.[7] ............................. G06F 15/00; H04N 1/46
(52) U.S. Cl. ........................ 358/1.15; 358/1.1; 358/1.9; 358/504
(58) Field of Search ............................... 358/1.15, 1.9, 358/3.23, 504, 1.1

(56) References Cited

U.S. PATENT DOCUMENTS

| | | | | |
|---|---|---|---|---|
| 5,132,786 A | * | 7/1992 | Ishiwata | 358/500 |
| 5,416,613 A | * | 5/1995 | Rolleston et al. | 358/518 |
| 5,689,350 A | * | 11/1997 | Rolleston | 358/504 |
| 5,764,807 A | * | 6/1998 | Pearlman et al. | 382/240 |
| 5,835,244 A | * | 11/1998 | Bestmann | 358/523 |
| 6,072,589 A | * | 6/2000 | Rozzi | 358/1.9 |
| 6,178,007 B1 | * | 1/2001 | Harrington | 358/1.9 |
| 6,215,562 B1 | * | 4/2001 | Michel et al. | 358/1.9 |
| 6,262,810 B1 | * | 7/2001 | Bloomer | 358/1.9 |
| 6,351,263 B1 | * | 2/2002 | Naoi | 345/589 |
| 6,351,308 B1 | * | 2/2002 | Mestha | 356/402 |
| 6,538,770 B1 | * | 3/2003 | Mestha | 358/1.9 |

* cited by examiner

*Primary Examiner*—Gabriel Garcia
*Assistant Examiner*—Thierry L Pham
(74) *Attorney, Agent, or Firm*—Fish & Richardson P.C.

(57) ABSTRACT

A method and apparatus, including a computer program product, implementing techniques for testing a printing system by using a color-managed output system. The techniques include providing a page having one or more test colors, specifying a range of acceptable standard color values in a standard color space for each test color, redefining in the output system a mapping from the standard color space to an output system color space, and printing the page from the printing system to the output system.

26 Claims, 2 Drawing Sheets

COLOR RENDERING DICTIONARY FOR TESTING COLOR CONVERSION

BACKGROUND OF THE INVENTION

The present invention relates to evaluating the accuracy of a color printing system.

It is conventional in the electronic printing industry to desire to print documents so that the colors from a printing press match the colors from a client's desktop color printer. The traditional approach has been for the printing press company to repeatedly make slight adjustments to the printing process until the colors from the printing press match the colors from a client's desktop color printer. This approach is expensive due to the time spent by skilled operators and the expensive equipment required to make the adjustments.

An emerging approach is to manage colors from their creation to the printer, to compensate for differences in computer monitors, desktop printers, and printing presses. The International Color Consortium promotes standardization of color management, centered around representing colors in a profile connection space (PCS). Each printer in a color managed workflow is described by a color profile, which defines how colors in the PCS control how much printer-specific colorant is used to print that color accurately. Different printers will be given slightly different color values for a particular color to compensate for the slight differences in each printer, so that ideally, the same color will be printed by all of the printers. The workflow can be described by a job definition format (JDF) file that can be associated with any printer definition language, such as the Adobe® portable document format (PDF), Adobe® PostScript® language, or Hewlett-Packard® printer control language (PCL).

Color profiles may also be used to display accurate colors, despite variances in computer monitors. Different computer monitors have different color profiles in a color managed workflow. Each such profile defines how colors in the PCS control how much monitor-specific phosphor is used to accurately display that color. Different monitors will be given slightly different color values for a particular color to compensate for slight differences in each monitor, so that ideally, the same color will be displayed by all the monitors.

Similar profiles can also be used to define characteristics of scanners and other color devices.

In a typical workflow, the user creates a color in some application color space using some color-managed application. One common application color space is L*a*b*, which has an algebraic relationship with a standard PCS. Another common application color space is RGB, which must be associated with a color profile in a color managed workflow. The RGB color profile is typically a monitor profile or scanner profile. The RGB color space combined with its color profile defines the relationship to the PCS.

In the most common workflow, color-managed documents are printed to printers or printing presses (output devices) that understand the PostScript language. Each of these output devices has a built-in printer profile that defines how colors in a particular PCS control how much printer-specific colorant is used to accurately print the color. One such PCS is the XYZ color space, which has been defined by the Commission International de l'Éclairage (CIE). To print colors in a document, the application and the driver together transform colors according to each associated application color space and generate a file of PostScript language commands. These commands, when executed by the output device, request colors in the XYZ color space. Using the built-in printer profile (called a color rendering dictionary or CRD in PostScript), these colors in XYZ color space are converted into device colors, which control how much colorant is used.

SUMMARY OF THE INVENTION

In general, in one aspect, the invention provides a method and apparatus, including a computer program product, implementing techniques for testing a printing system by using a color-managed output system. The techniques include providing a page having one or more test colors, specifying a range of acceptable standard color values in a standard color space for each test color, redefining in the output system a mapping from the standard color space to an output system color space, and printing the page from the printing system to the output system. Each test color appears alone in a separate test region of the page and is defined by an application color value in an application color-managed color space. The acceptable standard color values map to a set of success output system color values and other standard color values of colors map to a set of failure output system color values. The color conversion accuracy of the printing system can be evaluated according to the presence or absence of success or failure device output system color values in one or more diagnostic regions of the print output.

One problem with the color managed workflow is that it often does not work, especially when several applications or drivers are involved. The main cause of this problem is that application and driver developers have not had a quick, inexpensive, objective, and accurate means to detect problems in their implementations of this workflow.

Developers have traditionally tested their implementations by using the workflow to print to a printer, and comparing the results with benchmarks. The "printing" may be either physical or electronic. Comparing electronic results needs special software, since certain slight differences are still correct. One problem with this form of testing is the point at which the testing is performed. Instead of testing whether the application and driver together generate PostScript commands that indicate correct XYZ values, the testing is performed on the actual print output.

Testing the printed output means that if the printer converts XYZ values to wrong colorants, the developer will "correct" their implementation to produce wrong XYZ values to compensate, which means their implementation will print incorrectly on other printers. Developers can overcome this problem by having skilled operators use expensive equipment to calibrate the printer correctly, and to obtain correct benchmarks.

But even with this expensive adjustment, this traditional test process is inaccurate. A particular printer can only print some of the XYZ colors. A different printer will typically print most of the same colors, but will print some colors the first cannot, and will not print some colors the first can. Testing a workflow implementation with one printer means certain XYZ colors will not be tested.

Advantages that can be seen in implementations of the invention include one or more of the following. A color managed workflow can be tested without the use of skilled operators or expensive equipment, and without any changes being made to the workflow. The results may be assessed without benchmarks using a very simple test. A human tester can glance at a printed page and quickly determine whether the page was printed incorrectly. Colors from the full range of XYZ space may be tested. Printers with an incorrect built-in CRD or profile can be used to produce valid testing results.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
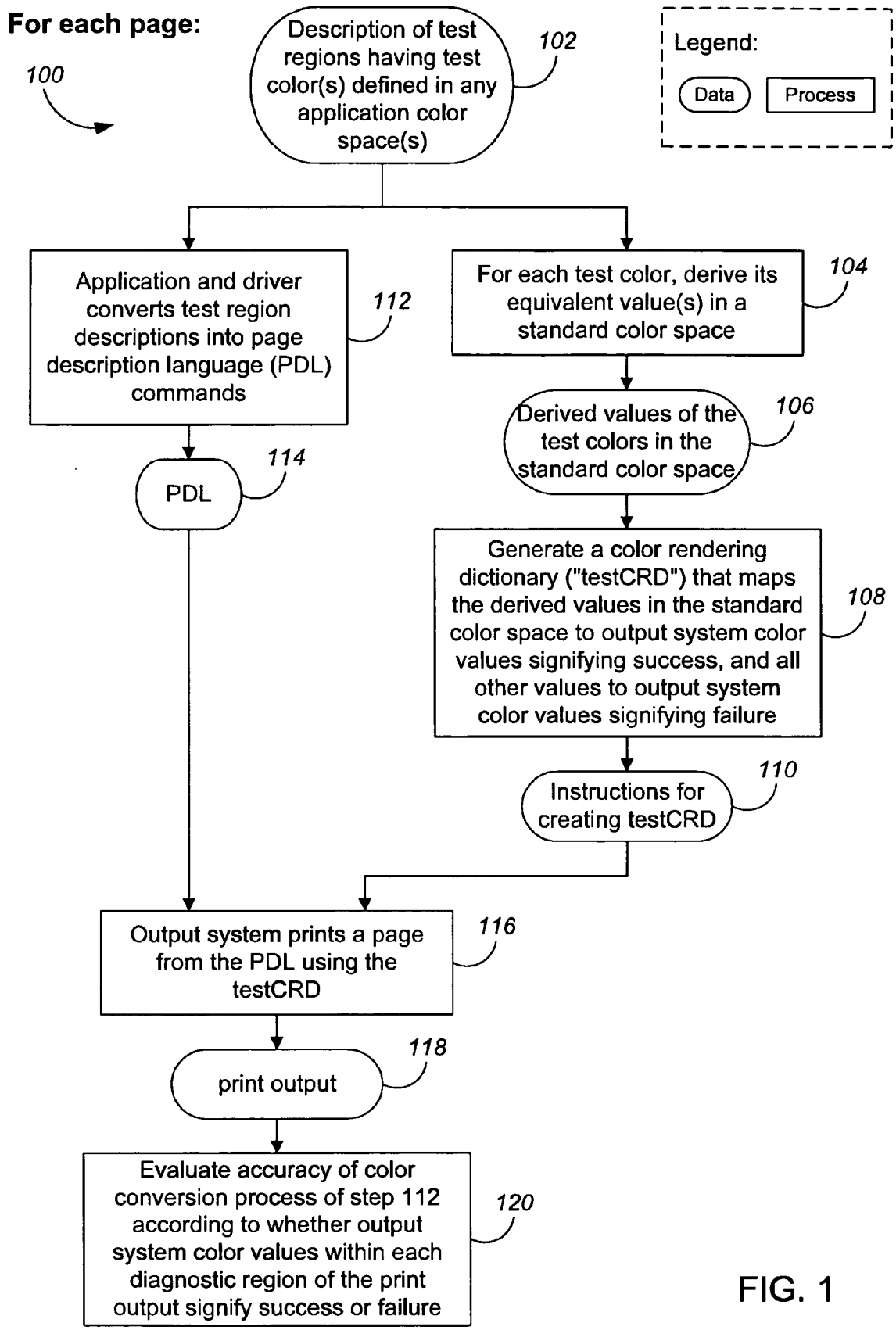
FIG. 1 is a flowchart of a color conversion evaluation process in accordance with the present invention.
Figure 2:
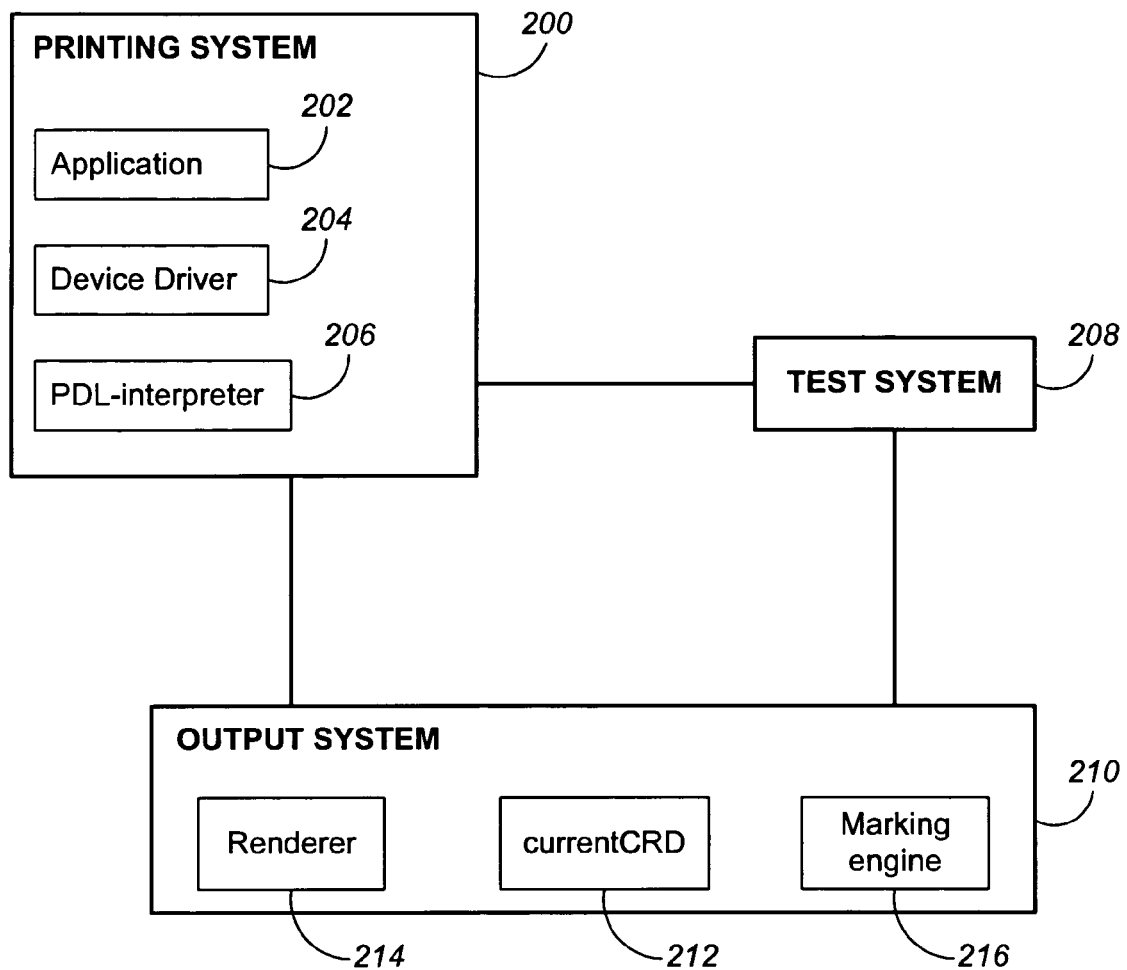
FIG. 2 is a block diagram of a printing system, a test system and an output system.

FIGS. 1 and 2 show a process 100, a printing system 200, a test system 208 and an output system 210 in accordance with the invention.

The input to the process 100 is a description of a page having one or more test colors (step 102). Each test color appears alone in a separate test region of the page and can be defined in any of a number of application color-managed color spaces ("application color spaces"). Suitable application color spaces include the CIE 1976 (L*a*b*)-space and a calibrated RGB space. In one implementation, the page is generated by an application 202, such as a document composition system, an illustrator or a computer-aided design system, in response to a request by a user (e.g., a test engineer) to run a diagnostic test of the printing system's color conversion process. Alternatively, the page is pre-stored in the printing system 200 and provided as an input to the process 100 when an automated self-diagnostic test of the printing system's color conversion process is run.

For each test color on the page, a test system 208 (interacting with the printing system 200 and an output system 210) derives a range of standard color values 106 in a standard color space, such as the CIE 1931 (XYZ)-space, using any one of a number of known algorithms or lookup tables (step 104). The range of standard color values 106 define the acceptable standard color values for a particular test color. The test system 208 then generates a set of instructions 110 for creating a color mapping mechanism, such as a color rendering dictionary (CRD) on a PostScript printer or an output profile on some other printer. Specifically, in the case of a PostScript printer, the test system 208 generates a set of instructions 110 for creating a CRD that maps the standard color values 106 of the test colors to a set of output system color values signifying success ("success output system color values") and all other standard color values to a set of output system color values signifying failure ("failure output system color values") (step 108). Each output system color value defines a color in the output system color space associated with the output system 210. Suitable output system color spaces include RGB color space, CMYK color space and grayscale space, each associated with an International Color Consortium (ICC) profile. It should be noted that the number of output system color values signifying success or failure, in addition to the actual values selected to signify success or failure can be user-specified or system-specified. In one implementation, there is exactly one success output system color value and one failure output system color value. In an alternative implementation, each success and failure output system color value represents the degree to which the actual output system color value outputted by the printing system 200 differs from the expected output system color value.

To distinguish between a CRD that is originally installed in the output system 210, the CRD that is generated by the test system 208 in step 108 and the CRD that is currently specified to be used by the output system 210 to process a page, the term "defaultCRD" will refer to the original CRD, the term "testCRD" will refer to the generated CRD, and the term "currentCRD" will refer to the currently-specified CRD. It should be noted that the defaultCRD is set as the currentCRD 212 unless otherwise specified.

The test system 208 sends the instructions 110 for creating the testCRD to a PDL-interpreter 206 of the printing system 200. Typically, the set of instructions 110 are represented in a page description language, such as the PostScript language. The PDL-interpreter 206 executes the instructions 110 and creates a testCRD that resides in the output system 210 as the currentCRD 212.

The printing system 200 uses the application 202 and a driver 204 to convert the description of the page into page description language (PDL) commands in step 112. These PDL commands can be sent to the PDL-interpreter 206 in the form of a PDL file 114. In one implementation, the PDL commands describe how the printing system 200 should transform each test color from its respective application color space to the standard color space. The PDL commands, when executed by the PDL-interpreter 206, request colors in the standard color space. A renderer 214 converts these colors in standard color space into output system colors using the testCRD. The output system colors can then be produced on a print output 118 using the output system's marking engine 216 (step 116).

The color conversion accuracy of the printing system 200 is evaluated by analyzing the print output 118 (step 120). Specifically, regions of the print output identified as diagnostic regions can be analyzed. The diagnostic regions can cover the entire print output 118 or a portion of the print output 118. Typically, a diagnostic region of the print output corresponds in size, shape and location to a test region of the page. In the case of a print output 118 produced on a visual media, such as a piece of paper, a film, or a display screen, each diagnostic region of the print output is analyzed for the absence or presence of success or failure colors.

Generally, it is advantageous to have selected success and failure colors (i.e., by selecting output system color values signifying success and failure in the testCRD) that are visually contrasting, such as white and black, to provide a user with an at-a-glance visual assessment of the color conversion accuracy of the printing system 200. That is, the mere presence of a failure color, such as black, in a diagnostic region of the print output would indicate that the test color in the corresponding test region was incorrectly processed by the printing system 200.

In the case of a print output 118 produced on non-visual media, such as a print file, each diagnostic region of the print output is analyzed for the absence or presence of success or failure output system color values. For example, in one implementation, the testCRD is configured to map the standard color values of the test colors to an output system color value of 0, and the standard color values of all the other colors to an output system color value of 1. When the output system 210 prints the page to a print file, a checksum algorithm is applied to the print file containing a bitmap to produce a value of zero (if all the test colors in the page are correctly processed by the printing system 200) or a non-zero value (if any one of the test colors in the page is incorrectly processed by the printing system 200).

If more than one page is to be printed, the test system 208 repeats the process 100 and generates a testCRD for each different page based on the test colors described in the page description of the respective page. The output system 210 can restore the defaultCRD as the currentCRD upon detection of a reset condition, such as a power up of the output system 210.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

By way of example, a printing device implementing an interpreter for a page description language, such as the PostScript language, includes a processor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium. It should be noted that the groupings of components into the printing system 200, the test system 208 and the output system 210 shown in FIG. 2 is a logical grouping that need not be followed in physical devices. For example, the PDL-interpreter 206, the renderer 214, the currentCRD 212 and the marking engine 216 can be physically located in a single printer device.

The invention has been described in terms of particular embodiments. Other embodiments are within the scope of the following claims. For example, the steps of the invention can be performed in a different order and still achieve desirable results.

What is claimed is:

1. A method for testing a printing system by using a color-managed output system, comprising;
   providing a page having one or more test colors, each test color appearing alone in a separate test region of the page, each test color being defined by an application color value in an application color-managed color space;
   for each test color, converting the application color value into a standard color value in a standard color space using a color profile associated with the printing system;
   specifying a range of acceptable standard color values in the standard color space for each test color;
   redefining in the output system a mapping from the standard color space to an output system color space, whereupon the acceptable standard color values map to a set of success output system color values and other standard color values map to a set of failure output system color values; and
   testing the color conversion accuracy of the printing system by printing the page from the printing system to the output system, wherein the printing includes using the mapping to obtain an output system color value for each test color and producing the output system color value on a print output, whereby the color conversion accuracy of the printing system can be evaluated according to the presence or absence of success output system color values in one or more diagnostic regions of the print output or the presence or absence of failure output system color values in the one or more diagnostic regions of the print output.

2. The method of claim 1, wherein the mapping is defined by a color rendering dictionary.

3. The method of claim 1, wherein the mapping is defined by a profile.

4. The method of claim 1, wherein the page has exactly one test color and no other colors.

5. The method of claim 1, wherein the diagnostic regions of the print output cover the entire print output or a portion of the print output.

6. The method of claim 1, wherein the page is represented in a page description language.

7. The method of claim 1, wherein the print output is produced on a piece of paper, on film, on a display screen or in a print file.

8. The method of claim 1, wherein each success and failure output system color value represents a degree of difference from an ideal color conversion.

9. The method of claim 1, wherein the range of acceptable standard color values is a single standard color value for each test color.

10. The method of claim 1, wherein each application color-managed color space is a CIE-based ABC color space, a CIE-based A color space, a CIE-based DEF color space, a CIE-based DEFG color space or a CIE 1976 (L*a*b*) color space.

11. The method of claim 1, wherein the standard color space is a CIE 1931 (XYZ)-space.

12. The method of claim 1, wherein the output system color space is an RGB color space, a CMYK color space or a grayscale space, each being associated with an International Color Consortium (ICC) profile.

13. A computer program product stored on a machine-readable medium for testing a printing system by using a color-managed output system, the product comprising instructions operable to cause a programmable processor to:

provide a page having one or more test colors, each test color appearing alone in a separate test region of the page, each test color being defined by an application color value in an application color-managed color space;

for each test color, convert the application color value into a standard color value in a standard color space using a color profile associated with the printing system;

specify a range of acceptable standard color values in the standard color space for each test color;

redefine in the output system a mapping from the standard color space to an output system color space, whereupon the acceptable standard color values map to a set of success output system color values and other standard color values map to a set of failure output system color values; and test the color conversion accuracy of the printing system by printing the page from the printing system to the output system, wherein the printing includes using the mapping to obtain an output system color value for each test color and producing the output system color value on a print output, whereby the color conversion accuracy of the printing system can be evaluated according to the presence or absence of success output system color values in one or more diagnostic regions of the print output, or the presence or absence of failure device output system color values in the one or more diagnostic regions of the print output.

14. The product of claim 13, wherein the mapping is defined by a color rendering dictionary.

15. The product of claim 13, wherein the mapping is defined by a profile.

16. The product of claim 13, wherein the page has exactly one test color and no other colors.

17. The product of claim 13, wherein the diagnostic regions of the print output cover the entire print output or a portion of the print output.

18. The product of claim 13, wherein the page is represented in a page description language.

19. The product of claim 13, wherein the print output is produced on a piece of paper, on film, on a display screen or in a print file.

20. The product of claim 13, wherein each success and failure output system color value represents a degree of difference from an ideal color conversion.

21. The product of claim 13, wherein the range of standard color values is a single standard color value for each test color.

22. The product of claim 13, wherein each application color-managed color space is a CIE-based ABC color space, a CIE-based A color space, a CIE-based DEF color space, a CIE-based DEFG color space or a CIE 1976 (L*a*b*) color space.

23. The product of claim 13, wherein the standard color space is a CIE 1931 (XYZ)-space.

24. The product of claim 13, wherein the output system color space is an RGB color space, a CMYK color space or a grayscale space, each being associated with an International Color Consortium (ICC) profile.

25. The method of claim 1, wherein the application color-managed color space, the standard color space, and the output system color space are different color spaces.

26. The product of claim 13, wherein the application color-managed color space, the standard color space, and the output system color space are different color spaces.

* * * * *